United States Patent
Higashi

(10) Patent No.: US 10,712,874 B2
(45) Date of Patent: Jul. 14, 2020

(54) POSITION DETECTION DEVICE, POSITION DETECTION SYSTEM, AND METHOD FOR CONTROLLING POSITION DETECTION DEVICE

(71) Applicant: SEIKO EPSON CORPORATION, Tokyo (JP)

(72) Inventor: Keisuke Higashi, Azumino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 16/142,331

(22) Filed: Sep. 26, 2018

(65) Prior Publication Data
US 2019/0095043 A1 Mar. 28, 2019

(30) Foreign Application Priority Data

Sep. 27, 2017 (JP) .................................. 2017-185854

(51) Int. Cl.
| | | |
|---|---|---|
| G06F 3/042 | (2006.01) | |
| G06F 3/041 | (2006.01) | |
| G06F 3/0354 | (2013.01) | |
| G06F 3/038 | (2013.01) | |

(52) U.S. Cl.
CPC .......... *G06F 3/0425* (2013.01); *G06F 3/0386* (2013.01); *G06F 3/03542* (2013.01); *G06F 3/04166* (2019.05); *G06F 3/04186* (2019.05)

(58) Field of Classification Search
CPC .... G06F 3/0386; G06F 3/03545; G06F 3/042; G06F 3/0425; G06F 3/017
See application file for complete search history.

(56) References Cited

U.S. PATENT DOCUMENTS

| | | | |
|---|---|---|---|
| 2009/0021491 A1 | 1/2009 | Kawamura | |
| 2013/0300696 A1* | 11/2013 | Haran | G06F 3/041 345/173 |
| 2014/0313166 A1* | 10/2014 | Rattray | H04N 9/3179 345/175 |
| 2015/0205345 A1 | 7/2015 | Naess et al. | |

FOREIGN PATENT DOCUMENTS

| | | |
|---|---|---|
| JP | 2011-164746 A | 8/2011 |
| JP | 2015-158887 A | 9/2015 |
| JP | 2016-066311 A | 4/2016 |
| WO | 2007/097414 A1 | 8/2007 |

\* cited by examiner

*Primary Examiner* — Xuemei Zheng
(74) *Attorney, Agent, or Firm* — Oliff PLC

(57) ABSTRACT

A projector includes: a position detection unit which detects a position pointed by a light pen (first pointer) and a position pointed by a user's finger or the like (second pointer) within a detection area; a state determination unit which determines a pointing direction of the light pen; and an invalid area setting unit which sets an invalid area where the position pointed by the second pointer is invalid, within the detection area, based on the position pointed by the light pen detected by the position detection unit and the pointing direction of the light pen determined by the state determination unit.

7 Claims, 11 Drawing Sheets

POSITION DETECTION DEVICE, POSITION DETECTION SYSTEM, AND METHOD FOR CONTROLLING POSITION DETECTION DEVICE

BACKGROUND

1. Technical Field

The present invention relates to a position detection device which detects a position pointed by a pointer, a position detection system, and a method for controlling a position detection device.

2. Related Art

As an interactive system that enables a user to touch a screen to point a position thereon, a system which can detect a pointing by a general-purpose pointer (for example, a user's finger) as well as a pointing by a dedicated pointer (for example, a light pen) is proposed. A position detection system disclosed in JP-A-2015-158887 can detect a position pointed by a first pointer, based on light emitted from the first pointer, and can also emit detection light to spread over a screen and thus detect a position pointed by a second pointer which does not emit light.

However, the position detection system disclosed in JP-A-2015-158887 may erroneously detect a position pointed by the first pointer (light pen) as a position pointed by the second pointer (finger) when the user's hand holding the first pointer or user's sleeve unintentionally touches the screen (detection light).

SUMMARY

An advantage of some aspects of the invention is to solve at least a part of the problems described above, and the invention can be implemented as the following forms or application examples.

Application Example 1

A position detection device according to this application example includes: a position detection unit which detects a position pointed by a first pointer and a position pointed by a second pointer within a detection area; a direction determination unit which determines a pointing direction of the first pointer; and a setting unit which sets an invalid area where the position pointed by the second pointer is invalid, within the detection area, based on the position pointed by the first pointer detected by the position detection unit and the pointing direction of the first pointer determined by the direction determination unit.

In the position detection device, the setting unit sets the invalid area where the position pointed by the second pointer is invalid, within the detection area, based on the position pointed by the first pointer and the pointing direction of the first pointer. Therefore, a position which the hand, sleeve or the like tends to touch when the user points with the first pointer can be set in the invalid area. This can restrain erroneous detection of a position touched by the hand, sleeve or the like as a position pointed by the second pointer.

Application Example 2

In the position detection device according to the application example, it is desirable that the setting unit sets the invalid area to the side opposite to the pointing direction determined by the direction determination unit, from the position pointed by the first pointer detected by the position detection unit.

In the position detection device, the setting unit sets the invalid area to the side opposite to the pointing direction from the pointed position. Therefore, a position which the hand, sleeve or the like tends to touch when the user points with the first pointer can be set in the invalid area.

Application Example 3

In the position detection device according to the application example, it is desirable that the direction determination unit acquires detection information about the pointing direction of the first pointer from the first pointer and determines the pointing direction, based on the detection information.

In the position detection device, the direction determination unit determines the pointing direction, based on the detection information acquired from the first pointer. Therefore, the position detection device need not have any measures for detecting the pointing direction. This can simplify the processing of the position detection device.

Application Example 4

In the position detection device according to the application example, the position detection unit may detect the position pointed by the first pointer, based on a position of light emitted from the first pointer. The direction determination unit may determine the pointing direction of the first pointer, based on luminance distribution of the light emitted from the first pointer.

In the position detection device, the direction determination unit determines the pointing direction, based on the luminance distribution of the light emitted from the first pointer. This makes it easy to determine the pointing direction.

Application Example 5

In the position detection device according to the application example, the position detection unit may detect the position pointed by the first pointer, based on a position of first light emitted from the first pointer. The direction determination unit may determine the pointing direction of the first pointer, based on a position of second light emitted from the first pointer.

In the position detection device, the direction determination unit determines the pointing direction, based on the position of the second light emitted from the first pointer. For example, the direction determination unit can determine the pointing direction, based on the positional relation between the position of the first light and the position of the second light. Thus, the direction determination unit can easily determine the pointing direction.

Application Example 6

A position detection system according to this application example includes a first pointer which emits light, a detection light emitting device which emits detection light along a detection area, and a position detection device. The position detection device includes: a position detection unit which detects a position pointed by the first pointer, based on a position of the light emitted from the first pointer within the detection area, and which detects a position pointed by a second pointer, based on a position where the second pointer reflects the detection light within the detection area; a direction determination unit which determines a pointing direction of the first pointer; and a setting unit which sets an invalid area where the position pointed by the second pointer is invalid, within the detection area, based on the position pointed by the first pointer detected by the position detection unit and the pointing direction of the first pointer determined by the direction determination unit.

In the position detection system, the setting unit of the position detection device sets the invalid area where the position pointed by the second pointer is invalid, within the detection area, based on the position pointed by the first pointer and the pointing direction of the first pointer. Therefore, a position which the hand, sleeve or the like tends to touch when the user points with the first pointer can be set in the invalid area. This can restrain erroneous detection of a position touched by the hand, sleeve or the like as a position pointed by the second pointer.

Application Example 7

A method for controlling a position detection device according to this application example is a method for controlling a position detection device which detects a position pointed by a first pointer and a position pointed by a second pointer within a detection area. The method includes: detecting the position pointed by the first pointer within the detection area; determining a pointing direction of the first pointer; and setting an invalid area where the position pointed by the second pointer is invalid, within the detection area, based on the position pointed by the first pointer that is detected and the pointing direction of the first pointer that is determined.

In the method for controlling the position detection device, the invalid area where the position pointed by the second pointer is invalid is set within the detection area, based on the position pointed by the first pointer and the pointing direction of the first pointer. Therefore, a position which the hand, sleeve or the like tends to touch when the user points with the first pointer can be set in the invalid area. This can restrain erroneous detection of a position touched by the hand, sleeve or the like as a position pointed by the second pointer.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

Hereinafter, a first embodiment of an image projection system which projects an image will be described with reference to the drawings.

Figure 1:
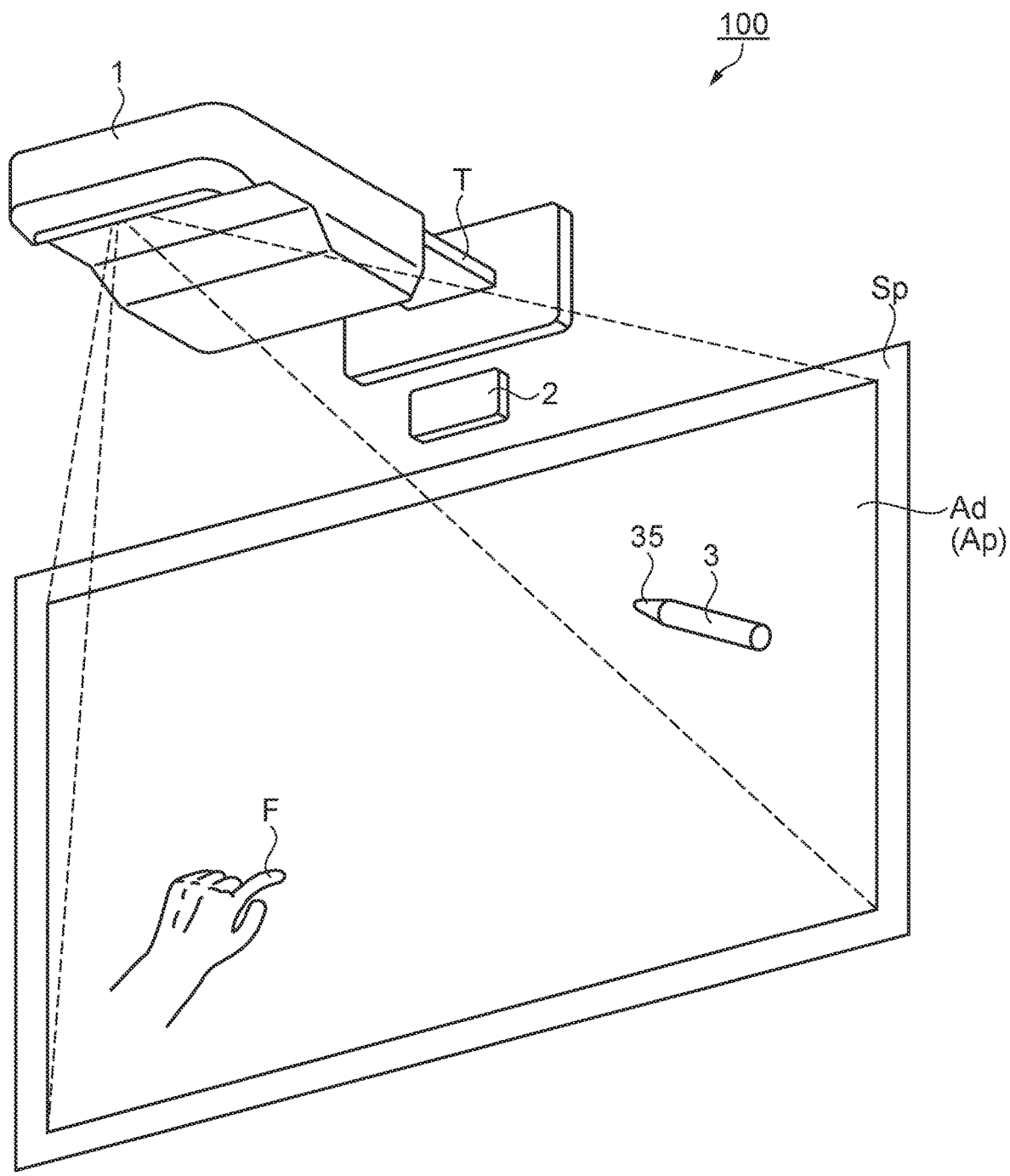
FIG. 1 is an explanatory view showing an image projection system according to a first embodiment.

FIG. 1 is an explanatory view showing an image projection system 100 according to the first embodiment.

As shown in FIG. 1, the image projection system 100 as a position detection system has a projector 1 as a position detection device, a light curtain unit 2 as a detection light emitting device, and a light pen 3 as a first pointer. The projector 1 projects an image on a projection surface Sp such as a screen, whiteboard, or wall surface. The projector 1 in this embodiment is fixed to a wall surface above the projection surface Sp via a fixing member T and projects an image toward the projection surface Sp arranged along the wall surface. The projector 1 can also pick up an image over a range including a detection area Ad on the projection surface Sp and can detect a position (pointed position) pointed by the light pen 3 within the detection area Ad, based on the position of light emitted from a light emitting unit 35 of the light pen 3.

The light curtain unit 2 is arranged above the projection surface Sp and below the projector 1 and emits planar detection light along the projection surface Sp so as to cover the entirety of the detection area Ad. This detection light enables detection of a position pointed by a general-purpose pointer (hereinafter also referred to as "second pointer") which does not emit light, such as a user's finger F or pointing stick (not illustrated). The projector 1 picks up an image over a range including the detection area Ad on the projection surface Sp and can detect a position (pointed position) pointed by the finger F or the like, based on the position of detection light reflected by the finger F or the like. In this embodiment, the detection area Ad where a pointed position can be detected is equal to a projection area Ap where an image is projected by the projector 1. However, the detection area Ad may be broader or narrower than the projection area Ap. Also, while the light curtain unit 2 and the light pen 3 in this embodiment emit infrared light, the light curtain unit 2 and the light pen 3 may also be configured to emit light in other wavelength ranges.

Figure 2:
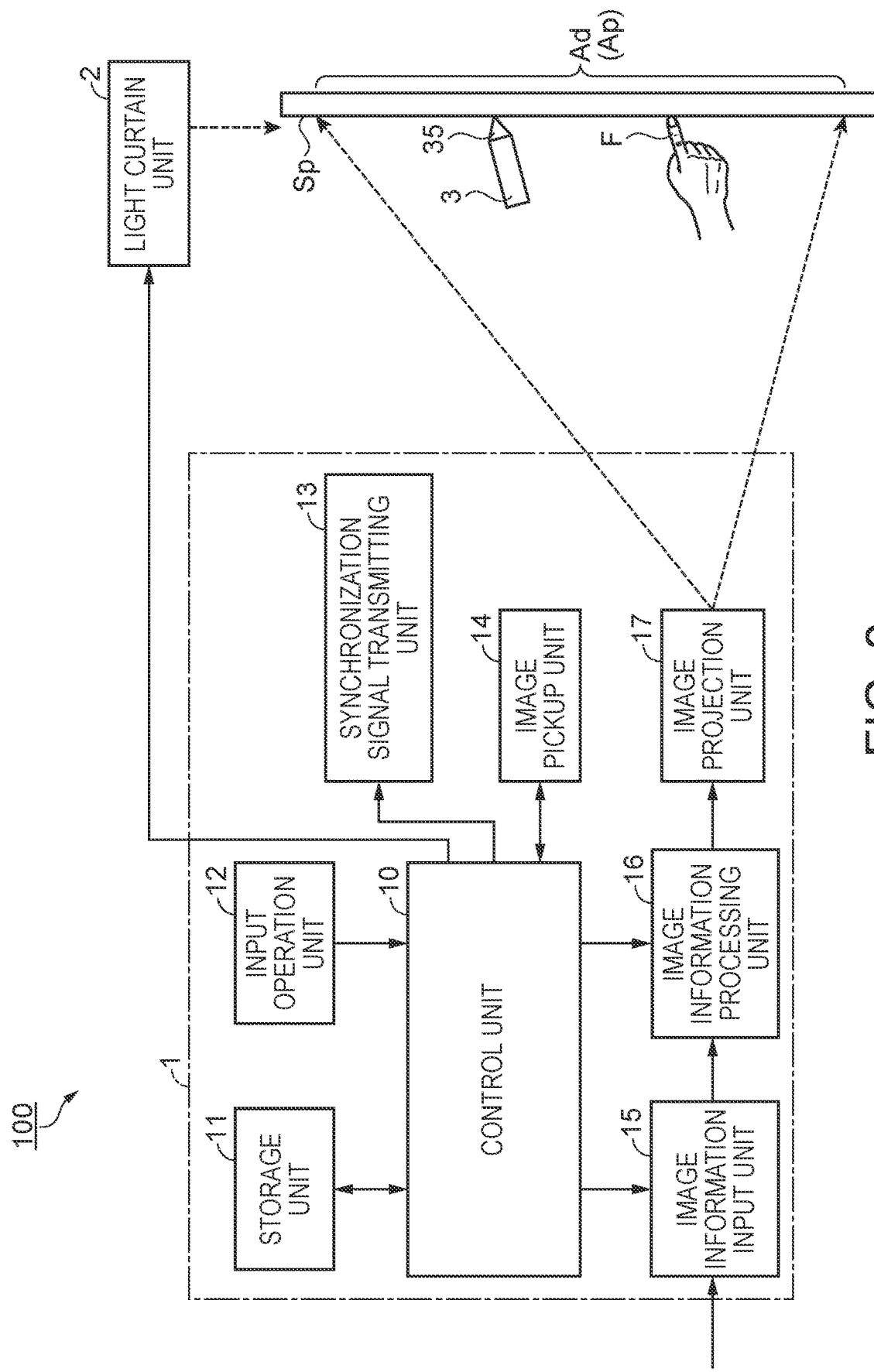
FIG. 2 is a block diagram showing a schematic configuration of a projector.
Figure 3:
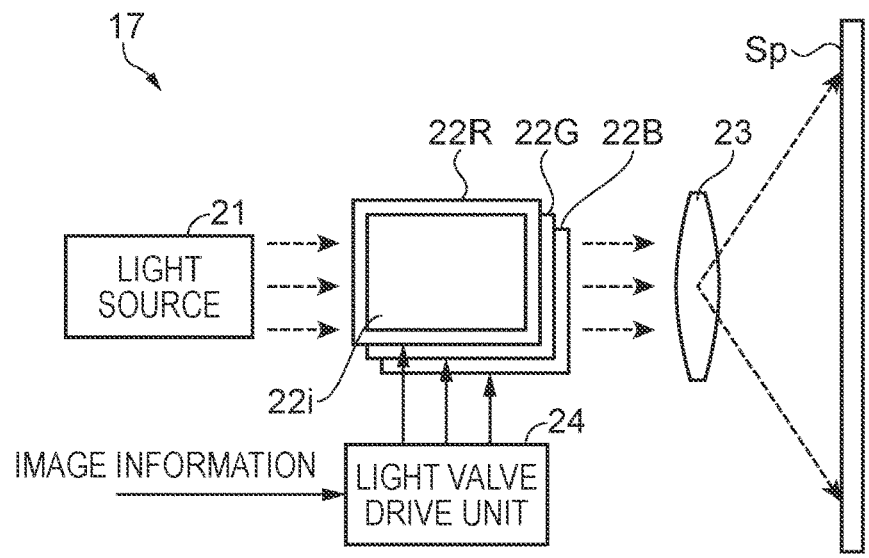
FIG. 3 is a block diagram showing a schematic configuration of an image projection unit provided in the projector.

FIG. 2 is a block diagram showing a schematic configuration of the projector 1. FIG. 3 is a block diagram showing a schematic configuration of an image projection unit 17 provided in the projector 1.

As shown in FIG. 2, the projector 1 has a control unit 10, a storage unit 11, an input operation unit 12, a synchronization signal transmitting unit 13, an image pickup unit 14, an image information input unit 15, an image information processing unit 16, and an image projection unit 17 as a projection unit, with these units integrated together. The projector 1 projects an image on the projection surface Sp from the image projection unit 17, based on image information inputted to the image information input unit 15.

The control unit 10 has one or a plurality of processors. The control unit 10 operates according to a control program stored in the storage unit 11 and thus comprehensively controls operations of the projector 1.

The storage unit 11 has memories such as a RAM (random access memory) and a ROM (read only memory). The RAM is used to temporarily store various data. The ROM stores a control program and control data or the like to control operations of the projector 1. The storage unit 11 may also store image information to project from the image projection unit 17.

The input operation unit 12 has a plurality of operation keys for the user to give various instructions to the projector 1. The operation keys of the input operation unit 12 include a "power key" to switch between power-on and power-off, a "menu key" to display a menu for various settings, a "direction key" to select a menu item, or the like. If the user operates the various operation keys of the input operation unit 12, the input operation unit 12 outputs an operation signal corresponding to the content of the operation by the user, to the control unit 10. Also, a remote controller (not illustrated) capable of remote control may be used as the input operation unit 12. In this case, the remote controller transmits an infrared operation signal corresponding to the content of the operation by the user, and a remote controller signal receiving unit, not illustrated, receives this operation signal and transmits the operation signal to the control unit 10.

The synchronization signal transmitting unit 13 has a light emitting unit for transmitting a pulse signal (synchronization signal) for synchronization to the light pen 3. As the light source of the light emitting unit, for example, an LED (light emitting diode) emitting infrared light is used. The synchronization signal transmitting unit 13 causes the light emitting unit to emit light periodically (for example, at a frequency of tens of hertz or the like) and transmits a synchronization signal to the light pen 3, under the control of the control unit 10. The light pen 3 periodically receives this synchronization signal and causes the light emitting unit 35 to emit light repeatedly at a timing synchronized with the received synchronization signal. The control unit 10 also controls the light curtain unit 2 in such a way that the light curtain unit 2 emits detection light repeatedly at a timing synchronized with this synchronization signal.

The image pickup unit 14 is a camera having an image pickup element (not illustrated) such as a CCD (charged coupled device) sensor or CMOS (complementary metal-oxide semiconductor) sensor. The image pickup unit 14 has an infrared transmission filter absorbing visible light and transmitting infrared light and thus picks up an image of infrared light via this infrared transmission filter. The image pickup unit 14 picks up an image of the detection area Ad on the projection surface Sp, under the control of the control unit 10, and outputs image information (picked-up image information) as the result of the image pickup to the control unit 10. The control unit 10 causes the image pickup unit 14 to pick up an image at a timing synchronized with the synchronization signal transmitted from the synchronization signal transmitting unit 13. That is, the image pickup unit 14 repeats image pickup according to the timing when the light pen 3 emits light and the timing when the light curtain unit 2 emits detection light.

The image information input unit 15 is connected to an external image supply device (not illustrated) such as a computer or image playback device, and receives image information supplied from the image supply device. The image information input unit 15 can also receive image information stored in the storage unit 11 and supplied from the control unit 10. The image information input unit 15 outputs the inputted image information to the information processing unit 16.

The information processing unit 16, under the control of the control unit 10, carries out various kinds of processing of the image information inputted from the image information input unit 15, and outputs the processed image information to a light valve drive unit 24 (see FIG. 3) of the image projection unit 17. For example, the information processing unit 16 processes the image information by adjusting image quality such as brightness and contrast, or by superimposing an OSD (on-screen display) image or the like, according to need.

The image information input unit 15 and the information processing unit 16 may be made up of one processor or a plurality of processors, or may be made up of a dedicated processing device such as ASIC (application specific integrated circuit) or FPGA (field programmable gate array).

As shown in FIG. 3, the image projection unit 17 has a light source 21, three liquid crystal light valves 22R, 22G, 22B as light modulation devices, a projection system 23, and a light valve drive unit 24 or the like. In the image projection unit 17, the liquid crystal light valves 22R, 22G, 22B modulate light emitted from the light source 21 and thus form image light, and the projection system 23 including at least one of a lens and a mirror projects this image light and thus displays an image on the projection surface Sp.

The light source 21 includes a discharge-type light source lamp such as an ultra-high-pressure mercury lamp or metal halide lamp, or a solid-state light source such as a light emitting diode or semiconductor laser. The light emitted from the light source 21 is converted into light of a substantially even luminance distribution by an optical integration system, not illustrated. The light is then split into color light components of the primary colors red (R), green (G), and blue (B) by a color separation system, not illustrated. The color light components then become incident on the corresponding liquid crystal light valves 22R, 22G, 22B.

Each of the liquid crystal light valves 22R, 22G, 22B is made up of a transmission-type liquid crystal panel or the like, formed by a pair of transparent substrates with a liquid crystal enclosed between them. In each liquid crystal panel, a rectangular image forming area 22i made up of a plurality of pixels arranged in the form of a matrix is formed. A drive voltage can be applied to the liquid crystal, pixel by pixel.

The light valve drive unit 24 forms an image in the image forming area 22i of the liquid crystal light valves 22R, 22G, 22B. Specifically, the light valve drive unit 24 applies a drive voltage corresponding to the image information inputted from the information processing unit 16, to each pixel in the image forming area 22i, and thus sets each pixel to a light transmittance corresponding to the image information. The light emitted from the light source 21 is transmitted through the image forming area 22i of the liquid crystal light valves 22R, 22G, 22B and thus modulated pixel by pixel, and forms an image light component corresponding to the image information for each color light. The resulting image light components of the respective colors are combined together pixel by pixel by a light combining system, not illustrated, and thus form image light representing a color image. The image light is projected in an enlarged manner on the projection surface Sp by the projection system 23. Thus, an image (input image) based on the image information inputted to the image information input unit 15 is displayed on the projection surface Sp.

Back to FIG. 2, the light curtain unit 2 has a light source, a parallelizing, and a Powell lens or the like (none of which is illustrated). As the light source, for example, an LD (laser diode) emitting infrared light is used. In the light curtain unit 2, the parallelizing lens parallelizes light emitted from the light source, and the Powell lens then uniformly diffuses the light over the entire detection area Ad. The light curtain unit 2 thus generates planar light covering the detection area Ad and outputs this light as detection light. The light curtain unit 2 is adjusted in such a way that the detection light is emitted substantially parallel to the projection surface Sp and that the space between the projection surface Sp and the detection light is, for example, several mm or the like. The light curtain unit 2 is connected to the projector 1 via a cable or wirelessly. The emission of the detection light by the light curtain unit 2 is controlled by the control unit 10 of the projector 1.

If, for example, the user points a position in the detection area Ad with the finger F, a part of the detection light emitted from the light curtain unit 2 is reflected by the finger F and its image is picked up by the image pickup unit 14.

Figure 4:
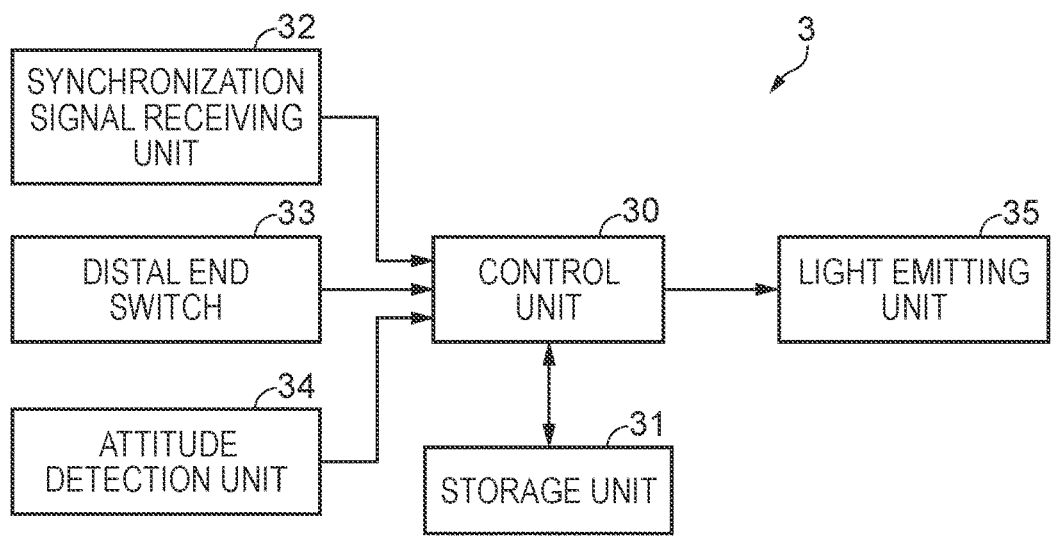
FIG. 4 is a block diagram showing a schematic configuration of a light pen.

FIG. 4 is a block diagram showing a schematic configuration of the light pen 3.

As shown in FIG. 4, the light pen 3 has a control unit 30, a storage unit 31, a synchronization signal receiving unit 32, a distal end switch 33, an attitude detection unit 34, and a light emitting unit 35.

The control unit 30 has one or a plurality of processors. The control unit 30 operates according to a control program stored in the storage unit 31 and thus comprehensively controls operations of the light pen 3.

The storage unit 31 is made up of a memory or the like which stores a control program and control data or the like for controlling operations of the light pen 3.

The synchronization signal receiving unit 32 is made up of a light receiving element or the like which receives infrared light. The synchronization signal receiving unit 32 receives a synchronization signal (infrared pulse signal) transmitted periodically from the synchronization signal transmitting unit 13 of the projector 1 and outputs the synchronization signal to the control unit 30.

The distal end switch 33 is arranged at a distal end part of the light pen 3 (tip of the pen). When an operation of pressing the distal end part against the projection surface Sp or the like is carried out, the distal end switch 33 detects the pressing of the distal end part and outputs the result of the detection to the control unit 30.

The attitude detection unit 34 detects the attitude of the light pen 3 in relation to the projection surface Sp, that is, the pointing direction of the light pen 3 (direction in which the tip of the pen faces), and outputs the result of the detection to the control unit 30. Specifically, the attitude detection unit 34 detects the pointing direction within a plane parallel to the projection surface Sp, that is, the pointing direction of the light pen 3 when the light pen 3 is projected on the projection surface Sp. As a sensor for detecting the pointing direction of the light pen 3, for example, one or a combination of a plurality of sensors, of an acceleration sensor, an angular velocity sensor, and a geomagnetic sensor or the like, may be used. The accuracy of detection of the pointing direction need not be very high and may be, for example, every 30 degrees or every 45 degrees.

The light emitting unit 35 has a light source (for example, LED) arranged near the distal end part of the light pen 3 and emits infrared light under the control of the control unit 30. The control unit 30 causes the light emitting unit to emit light repeatedly, synchronously with the synchronization signal received periodically by the synchronization signal receiving unit 32. Specifically, the control unit 30, for example, divides one period of the synchronization signal into a plurality of periods (hereinafter also referred to as "phases"). During several predetermined phases (hereinafter referred to as "position detection phases") of those phases, the control unit 30 causes the light emitting unit 35 to emit light without exception. During the other phases (hereinafter referred to as "state determination phases"), the control unit 30 decides whether to cause the light emitting unit 35 to emit light or not, based on the state of the distal end switch 33 and the result of the detection by the attitude detection unit 34. The control unit 30 then notifies the projector 1 of information about the state of the distal end switch 33 and the result of the detection by the attitude detection unit 34, based on the transition of the light emission state (hereafter also referred to as "light emission sequence") of the light emitting unit 35 over a plurality of periods. The information notified based on the light emission sequence is equivalent to detection information.

Figure 5:
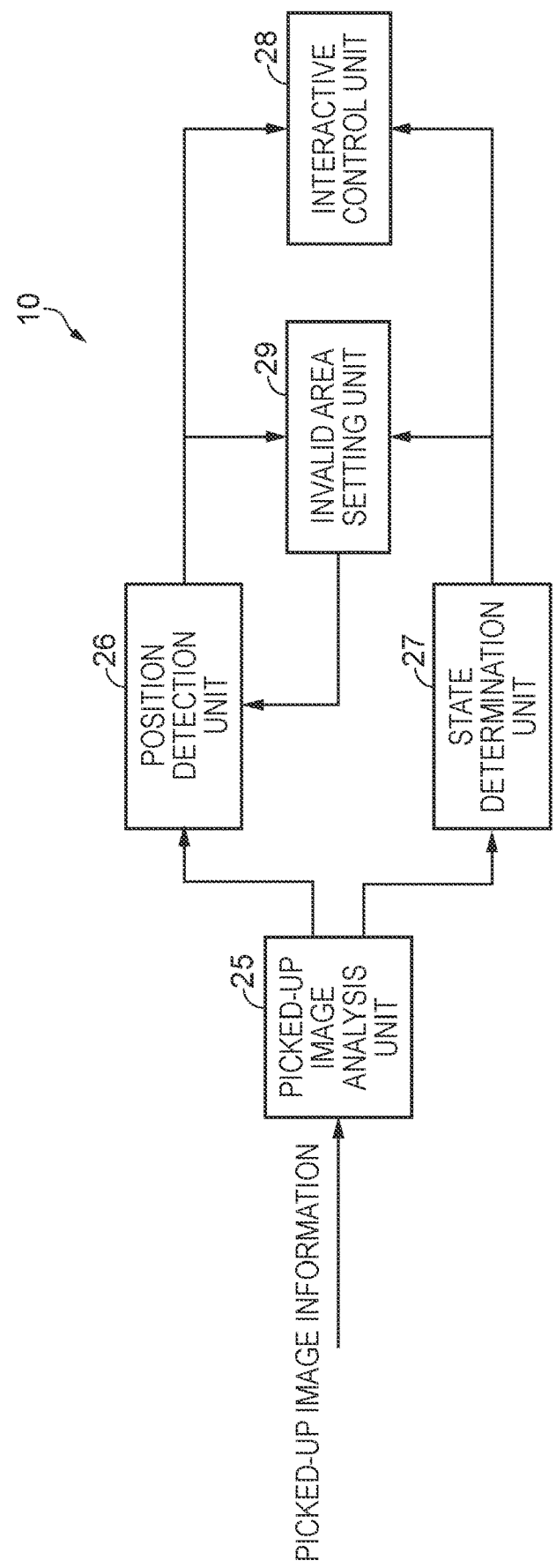
FIG. 5 is a block diagram showing a schematic configuration of a control unit of the projector.

FIG. 5 is a block diagram showing a schematic configuration of the control unit 10 of the projector 1. As functional blocks controlled by a control program, the control unit 10 has a picked-up image analysis unit 25, a position detection unit 26, a state determination unit 27 as a direction determination unit, an interactive control unit 28, and an invalid area setting unit 29 as a setting unit.

The picked-up image analysis unit 25 analyzes each of images based on picked-up image information inputted from the image pickup unit 14, that is, each of picked-up images picked up repeatedly by the image pickup unit 14, and extracts light from a pointer, that is, light emitted by the light pen 3, and detection light reflected by the finger F or the like, from the detection area Ad within the picked-up image. The picked-up image analysis unit 25 determines and extracts, as the light from the pointer, an infrared light image of a size within a predetermined range, from among infrared light images included in the detection area Ad of the picked-up image. The picked-up image analysis unit 25 determines an infrared light image having a size out of the predetermined range, as a noise, and therefore does not extract this infrared light image.

During the position detection phases, of the plurality of phases formed by dividing one period of the synchronization signal, the control unit 10 causes the light curtain unit 2 to emit detection light. During the state determination phases, the control unit 10 does not cause the light curtain unit 2 to emit detection light. Therefore, of the light extracted by the picked-up image analysis unit 25, light extracted only during the position detection phases without exception can be determined as the detection light from the light curtain unit 2, that is, light reflected by the second pointer such as the finger F. Meanwhile, light that can be extracted during the state determination phases as well as during the position detection phases can be determined as the light emitted from the light pen 3. In this way, the picked-up image analysis unit 25 extracts, from the picked-up image, the light emitted from the light pen 3 and the detection light reflected by the finger F or the like in a discriminating manner. Although the detection light from the light curtain unit 2 is also reflected by the light pen 3, the picked-up image analysis unit 25 ignores the reflected light of the detection light if the light emitted from the light pen 3 and the reflected light of the detection light are extracted at substantially the same position.

The position detection unit 26 detects the positions pointed by the light pen 3 and the finger F or the like, based on the result of analyzing the picked-up images picked up during the position detection phases, of the results of analysis by the picked-up image analysis unit 25. A position on the input image displayed in the projection area Ap and a position on the projection area Ap within the picked-up image are associated with each other by calibration processing carried out in advance. The position detection unit 26 can specify a pointed position on the input image, based on the pointed position extracted on the picked-up image. The position detection unit 26 outputs information that represents the detected pointed position, to the interactive control unit 28 and the invalid area setting unit 29.

The state determination unit 27 recognizes the light emission sequence of the light pen 3, based on the result of analyzing, over a plurality of periods, the picked-up images picked up during the state determination phases, of the results of analysis by the picked-up image analysis unit 25. The state determination unit 27 then acquires detection information of the light pen 3 based on the light emission sequence, and determines the state of the distal end switch 33 of the light pen 3 and the pointing direction of the light pen 3, based on the acquired detection information. The state determination unit 27 outputs information that represents the determined state of the distal end switch 33 to the interactive control unit 28. The state determination unit 27 outputs information that represents the determined pointing direction of the light pen 3 to the invalid area setting unit 29.

The interactive control unit 28 controls operations of the projector 1, based on the pointed position specified by the position detection unit 26 and the state of the distal end switch 33 determined by the state determination unit 27. For example, the interactive control unit 28 can cause the information processing unit 16 to carry out processing to superimpose a cursor or pointer at the pointed position detected by the position detection unit 26. Also, if the position pointed by the finger F or the like is moved or if the position pointed by the light pen 3 is moved while the distal end switch 33 is pressed, the interactive control unit 28 can cause the information processing unit 16 to carry out processing to draw a line that follows the trajectory of the pointed position. If the finger F or the like points a certain position or the distal end switch 33 of the light pen 3 is pressed when a certain selection menu is projected, the interactive control unit 28 carries out processing to finalize an item selected based on the pointed position, or the like.

The invalid area setting unit 29 specifies an invalid area within the detection area Ad, based on the position pointed by the light pen 3 specified by the position detection unit 26 and the pointing direction of the light pen 3 determined by the state determination unit 27. The invalid area is an area where the detection of the second pointer such as the finger F is invalid. The invalid area is set at a position where the user's hand holding the light pen 3 or the user's sleeve or the like tends to come into contact with the detection light from the light curtain unit 2 when the user points a position in the detection area with the light pen 3. Specifically, the user holding the light pen 3 often points a position, directing the light pen 3 in a direction away from the user. Therefore, the invalid area setting unit 29 sets the invalid area to the side where the user is situated as viewed from the position pointed by the light pen 3, that is, opposite to the pointing direction of the light pen 3. Details of the invalid area will be described later.

Next, operations of the projector 1 will be described.

Figure 6:
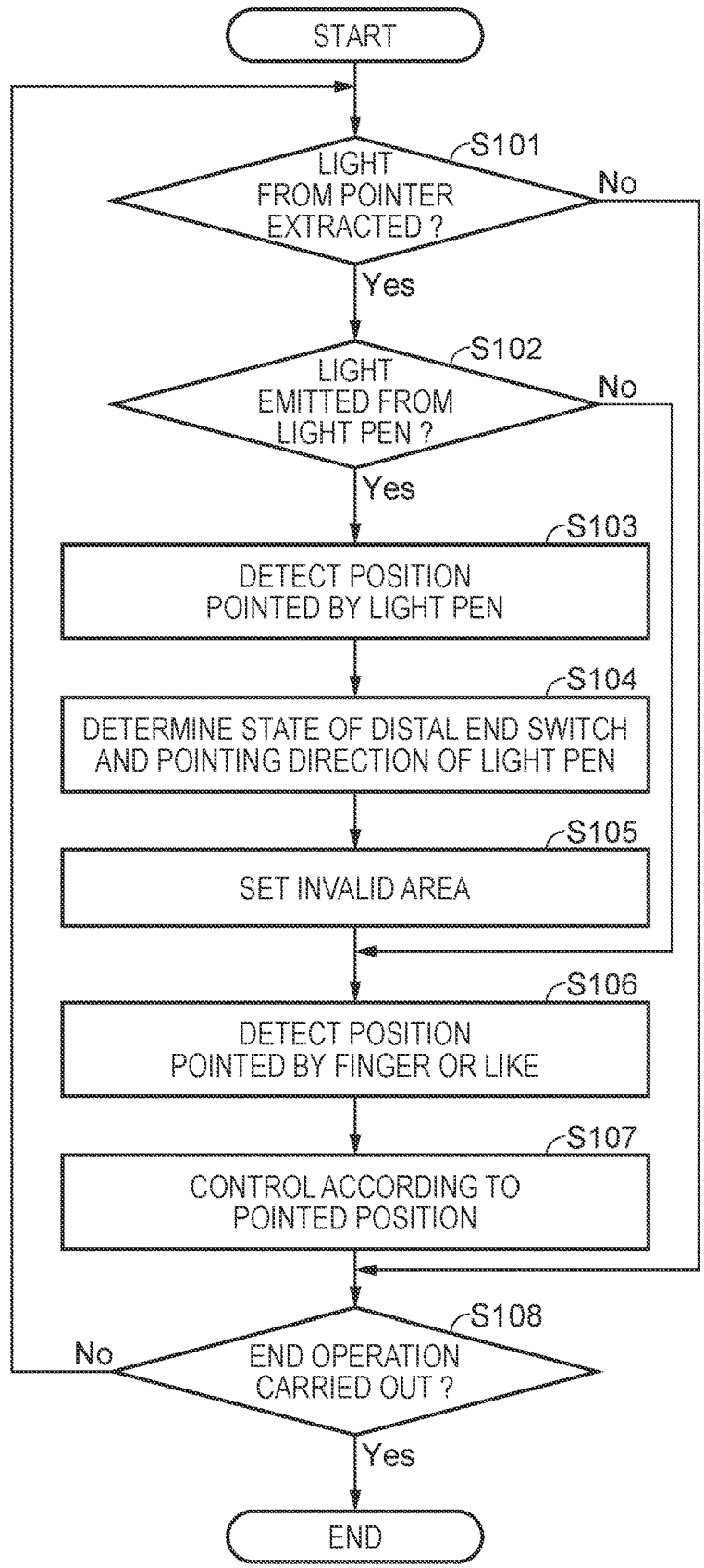
FIG. 6 is a flowchart for explaining operations of the projector.

FIG. 6 is a flowchart for explaining operations of the projector 1. The control unit 10 of the projector 1 operates according to the flow shown in FIG. 6, while the projector 1 is projecting an image on the projection surface Sp.

As shown in FIG. 6, in step S101, the control unit 10 determines whether the light from the pointer is extracted within the detection area Ad in the picked-up image or not, based on the result of the analysis by the picked-up image analysis unit 25. If the light from the pointer is not extracted, the control unit 10 shifts the processing to step S108. If the light from the pointer is extracted, the control unit 10 shifts the processing to step S102.

If the light from the pointer is extracted and the processing shifts to step S102, the control unit 10 determines whether the light extracted by the picked-up image analysis unit 25 discriminating the light emitted from the light pen 3 and the detection light reflected by the finger F or the like includes the light emitted from the light pen 3 or not. If the light emitted from the light pen 3 is extracted, the control unit 10 shifts the processing to step S103. If the light emitted from the light pen 3 is not extracted and only the detection light reflected by the finger F or the like is extracted, the control unit 10 shifts the processing to step S106.

If the light emitted from the light pen 3 is extracted and the processing shifts to step S103, the position detection unit 26 detects the position pointed by the light pen 3. Then, in step S104, the state determination unit 27 determines the state of the distal end switch 33 of the light pen 3 and the pointing direction of the light pen 3.

In step S105, the invalid area setting unit 29 sets an invalid area within the detection area Ad, based on the position pointed by the light pen 3 and the pointing direction of the light pen 3, and outputs information about the set invalid area to the position detection unit 26.

Figure 7:
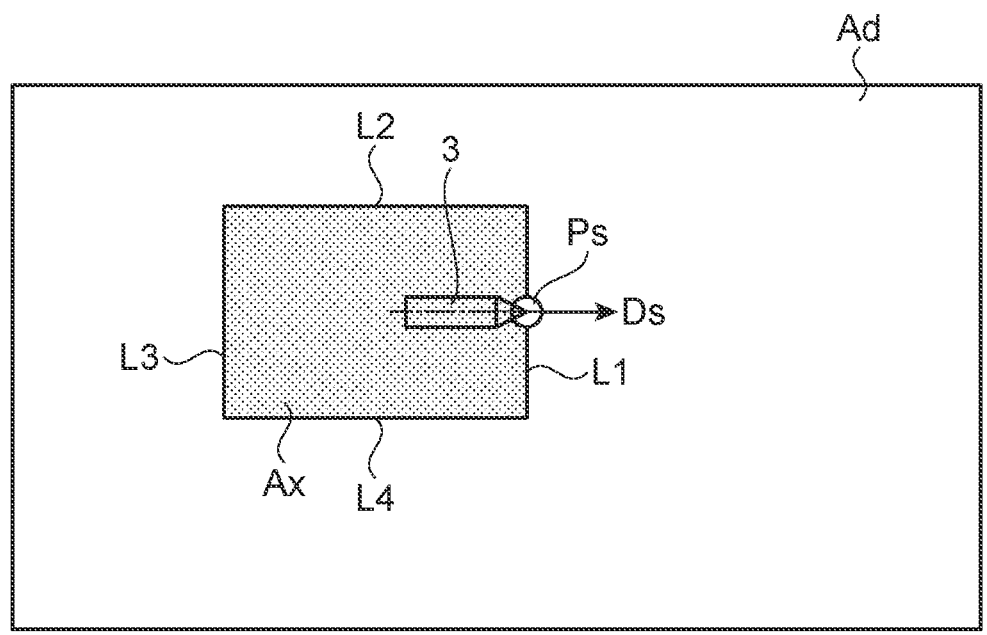
FIG. 7 shows an invalid area set within a detection area and an example where the pointing direction of the light pen is to the right.
Figure 8:
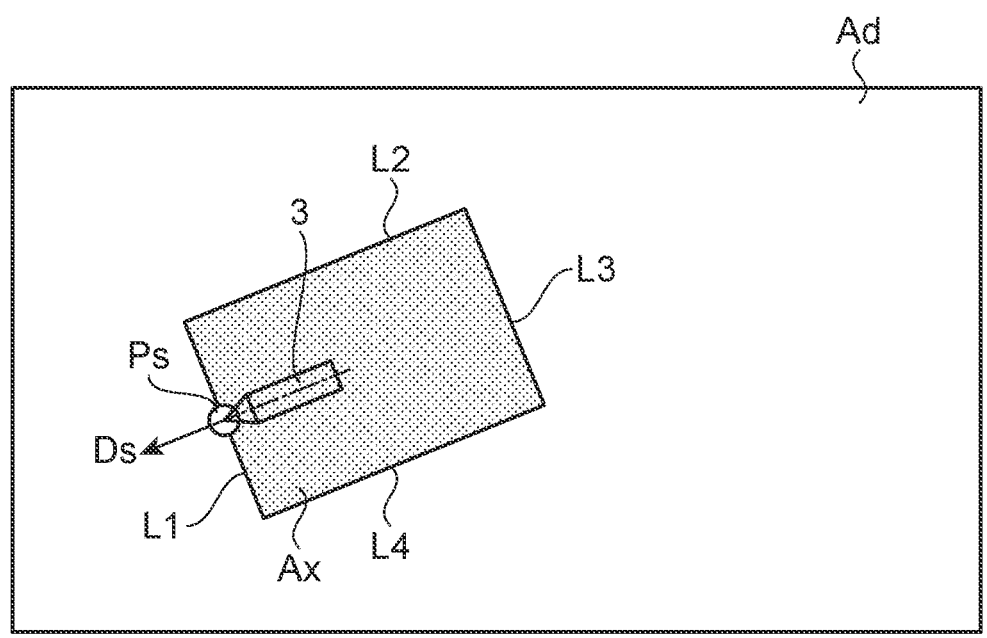
FIG. 8 shows the invalid area set within the detection area and an example where the pointing direction of the light pen is to the left.

FIGS. 7 and 8 show an invalid area Ax set within the detection area Ad as viewed from the front. FIG. 7 shows an example where the pointing direction Ds of the light pen 3 is to the right. FIG. 8 shows an example where the pointing direction Ds of the light pen 3 is to the left.

As shown in FIGS. 7 and 8, the invalid area Ax in this embodiment is a rectangular area surrounded by four boundaries L1 to L4. The location and tilt of the invalid area Ax change according to a position Ps pointed by the light pen and the pointing direction Ds of the light pen 3. Specifically, the invalid area Ax is surrounded by the boundaries L1, L3 perpendicular to the pointing direction Ds and the boundaries L2, L4 parallel to the pointing direction Ds. The boundary L1 is arranged to pass through the pointed position Ps. The boundary L3 opposite the boundary L1 is arranged opposite to the pointing direction Ds from the pointed position Ps (boundary line L1). That is, the invalid area Ax is set to the side opposite to the pointing direction Ds from the position Ps pointed by the light pen 3. The boundaries L2 and L4 are arranged at equal distances from the pointed position Ps.

Back to FIG. 6, in step S106, the position detection unit 26 detects the position pointed by the second pointer such as the finger F. If the invalid area Ax is set in step S105, the position detection unit 26 detects only a pointed position situated in a range excluding the invalid area Ax. That is, the position detection unit 26 ignores a pointing by the second pointer within the invalid area Ax.

In step S107, the interactive control unit 28 executes control corresponding to the pointed position as described above, based on the pointed position specified by the position detection unit 26 and the state of the distal end switch 33 determined by the state determination unit 27.

In step S108, the control unit 10 determines whether an operation to end the processing is carried out by the user or not, based on an operation signal from the input operation unit 12. If the operation is carried out, the control unit 10 carries out necessary end processing and then ends the processing. If the operation is not carried out, the control unit 10 returns the processing to step S101.

As described above, the projector 1, the image projection system 100, and the method for controlling these in this embodiment have the following effects.

(1) According to this embodiment, the invalid area setting unit 29 sets the invalid area Ax, where a position pointed by the finger F or the like is invalid, in the detection area Ad, based on the position Ps pointed by the light pen 3 and the pointing direction Ds of the light pen 3. Therefore, a position which the hand, sleeve or the like tends to touch when the user points with the light pen 3 can be set in the invalid area Ax. This can restrain erroneous detection of a position touched by the hand, sleeve or the like as a position pointed by the second pointer.

(2) According to this embodiment, the invalid area setting unit 29 sets the invalid area Ax to the side opposite to the pointing direction Ds from the position Ps pointed by the light pen 3. Therefore, a position which the hand, sleeve or the like tends to touch when the user points with the light pen 3 can be set in the invalid area Ax.

(3) According to this embodiment, the state determination unit 27 determines the pointing direction Ds, based on the detection information (light emission sequence) acquired from the light pen 3. Therefore, the projectors 1 need not have any measures for detecting the pointing direction Ds. This can simplify the processing of the projector 1.

(4) According to this embodiment, the light pen 3 changes the light emission sequence, based on whether the distal end switch 33 is pressed or not. That is, the light pen 3 is configured in such a way that the light emitting unit 35 emits light regardless of whether the distal end switch 33 is pressed or not. Therefore, the projector 1 can be notified of the pointed position Ps and the pointing direction Ds, regardless of whether the distal end switch 33 is pressed or not.

Second Embodiment

An image projection system 100 according to a second embodiment will now be described.

In the first embodiment, the attitude detection unit 34 provided in the light pen 3 detects the pointing direction Ds of the light pen 3. However, in the second embodiment, the projector 1 detects the pointing direction Ds, based on the luminance distribution of light cast onto the projection surface Sp from the light emitting unit 35 of the light pen 3. Therefore, the light pen 3 in this embodiment does not need the attitude detection unit 34, and the control unit 30 of the light pen 3 decides whether the light emitting unit 35 emits light or not in the state determination phases, simply based on the state of the distal end switch 33.

Figure 9:
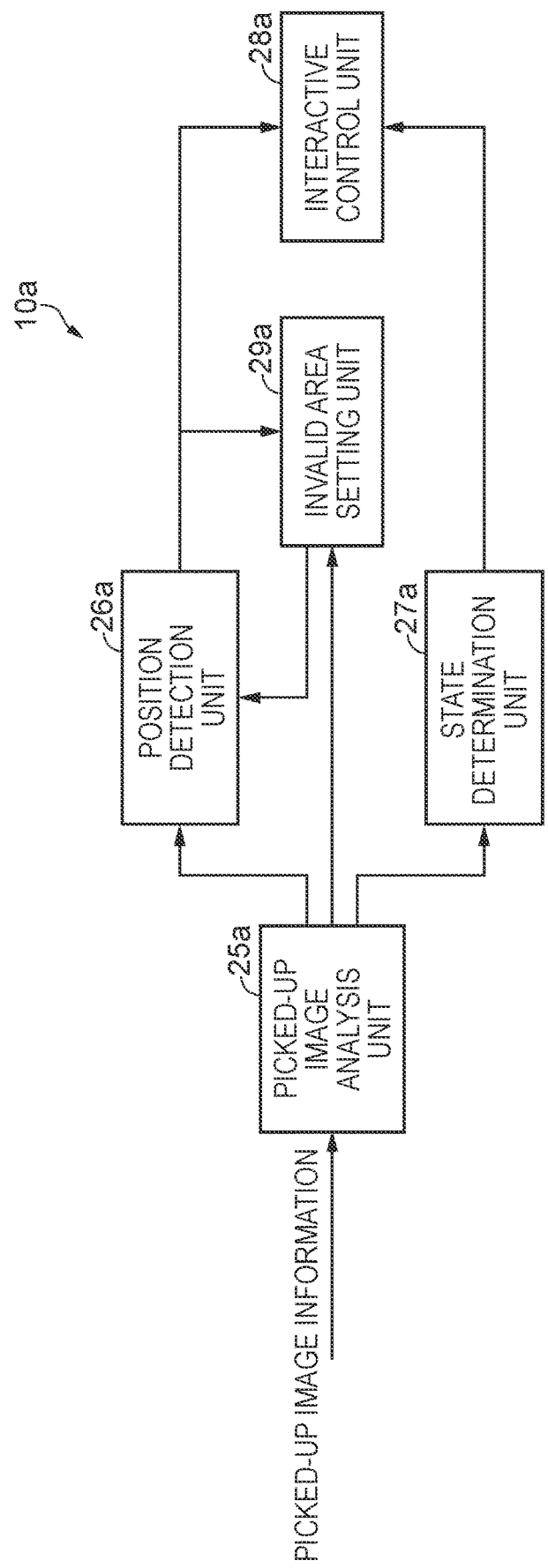
FIG. 9 is a block diagram showing a schematic configuration of a control unit of a projector according to a second embodiment.
Figure 10:
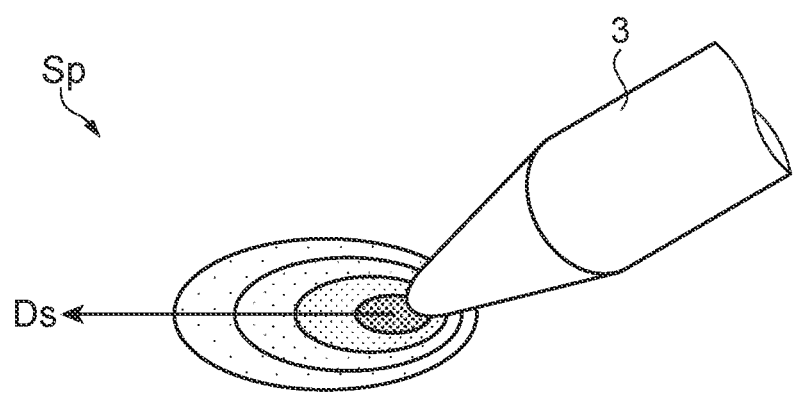
FIG. 10 is an explanatory view for explaining luminance distribution of light emitted from the light pen.

FIG. 9 is a block diagram showing a schematic configuration of a control unit 10a of the projector 1 according to the second embodiment. FIG. 10 is an explanatory view for explaining the luminance distribution of light emitted from the light pen 3.

As shown in FIG. 9, as in the first embodiment, the control unit 10a has, as function blocks implemented by a control program, a picked-up image analysis unit 25a, a position detection unit 26a, a state determination unit 27a, an interactive control unit 28a, and an invalid area setting unit 29a as a setting unit.

The picked-up image analysis unit 25a in this embodiment extracts, from the picked-up image, the light emitted from the light pen 3 and the detection light reflected by the finger F or the like in a discriminating manner, and detects the pointing direction Ds of the light pen 3, based on the luminance distribution of the light emitted from the light pen 3.

If the light pen 3 is in contact with or close to the projection surface Sp, the infrared light emitted from the light pen 3 is cast on the projection surface Sp. If the attitude of the light pen 3 is perpendicular to the projection surface Sp, the infrared light spreads with uniform luminance distribution from the tip of the light pen 3. However, if the light pen 3 is tilted in relation to the projection surface Sp, as shown in FIG. 10, the luminance distribution of the infrared light is uneven according to the tilt of the light pen 3. Specifically, on the projection surface Sp where the infrared light is cast, an area having a brightness equal to or higher than a predetermined threshold is formed to extend into the pointing direction Ds from the tip of the pen (pointed position). The luminance change in the pointing direction Ds from the tip of the light pen 3 is gentler than the luminance change in the opposite direction. Thus, the picked-up image analysis unit 25a can detect the pointing direction Ds of the light pen 3, based on the luminance distribution of the light emitted from the light pen 3. Therefore, in this embodiment, the picked-up image analysis unit 25a is equivalent to a direction determination unit.

The other parts of the configuration are similar to those of the first embodiment. That is, the position detection unit 26a detects the positions pointed by the light pen 3 and the finger F or the like, based on the result of the analysis by the picked-up image analysis unit 25a. The state determination unit 27a determines the state of the distal end switch 33 of the light pen 3, based on the result of the analysis by the picked-up image analysis unit 25a. The interactive control unit 28a controls operations of the projector 1, based on the pointed positions specified by the position detection unit 26a and the state of the distal end switch 33 determined by the state determination unit 27a.

Also, as in the first embodiment, the invalid area setting unit 29a sets the invalid area Ax within the detection area Ad, based on the position Ps pointed by the light pen 3 specified by the position detection unit 26a and the pointing direction Ds of the light pen 3 detected by the picked-up image analysis unit 25a. When the invalid area Ax is set, the position detection unit 26a detects only a pointed position situated within the area excluding the invalid area Ax, in detecting the position pointed by the second pointer such as the finger F.

As described above, the projector 1, the image projection system 100, and the method for controlling these according to this embodiment have the following effects, in addition to the effects the first embodiment.

(1) According to this embodiment, the picked-up image analysis unit 25a determines the pointing direction Ds, based on the luminance distribution of the light emitted from the light pen 3. This makes it possible to easily determine the pointing direction Ds.

(2) According to this embodiment, the light pen 3 is configured in such a way that the light emitting unit 35 emits light regardless of whether the distal end switch 33 is pressed or not. Therefore, the picked-up image analysis unit 25a can detect the pointing direction Ds of the light pen 3 regardless of whether the distal end switch 33 is pressed or not, provided that the tip of the light pen 3 is close to the projection surface Sp.

Third Embodiment

An image projection system 100 according to a third embodiment will now be described.

In the first embodiment, when detecting the position pointed by the finger F or the like, the position detection unit 26 detects a pointed position situated in the area excluding the invalid area Ax after the invalid area Ax is set. In contrast, the projector 1 in this embodiment detects the position pointed by the finger F or the like from the entire detection area Ad and then set the invalid area Ax. If the detected pointed position is situated within the invalid area Ax, this pointed position is invalidated.

Figure 11:
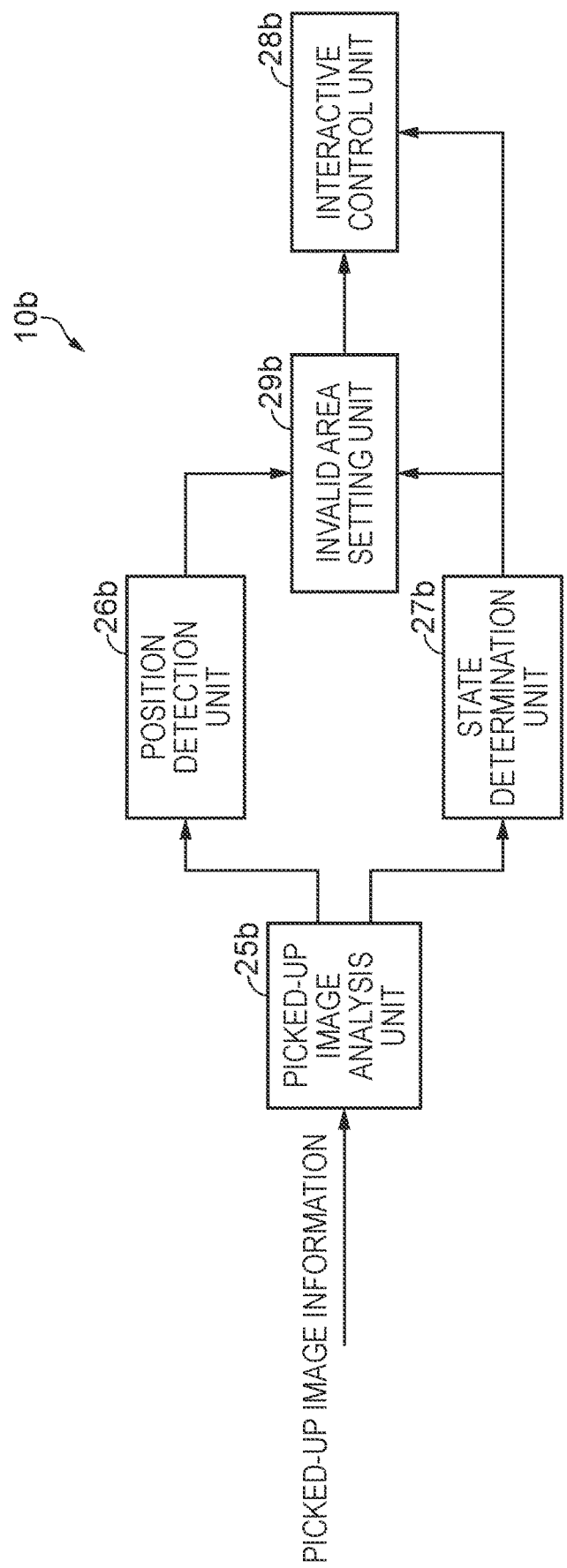
FIG. 11 is a block diagram showing a schematic configuration of a control unit of a projector according to a third embodiment.
Figure 12:
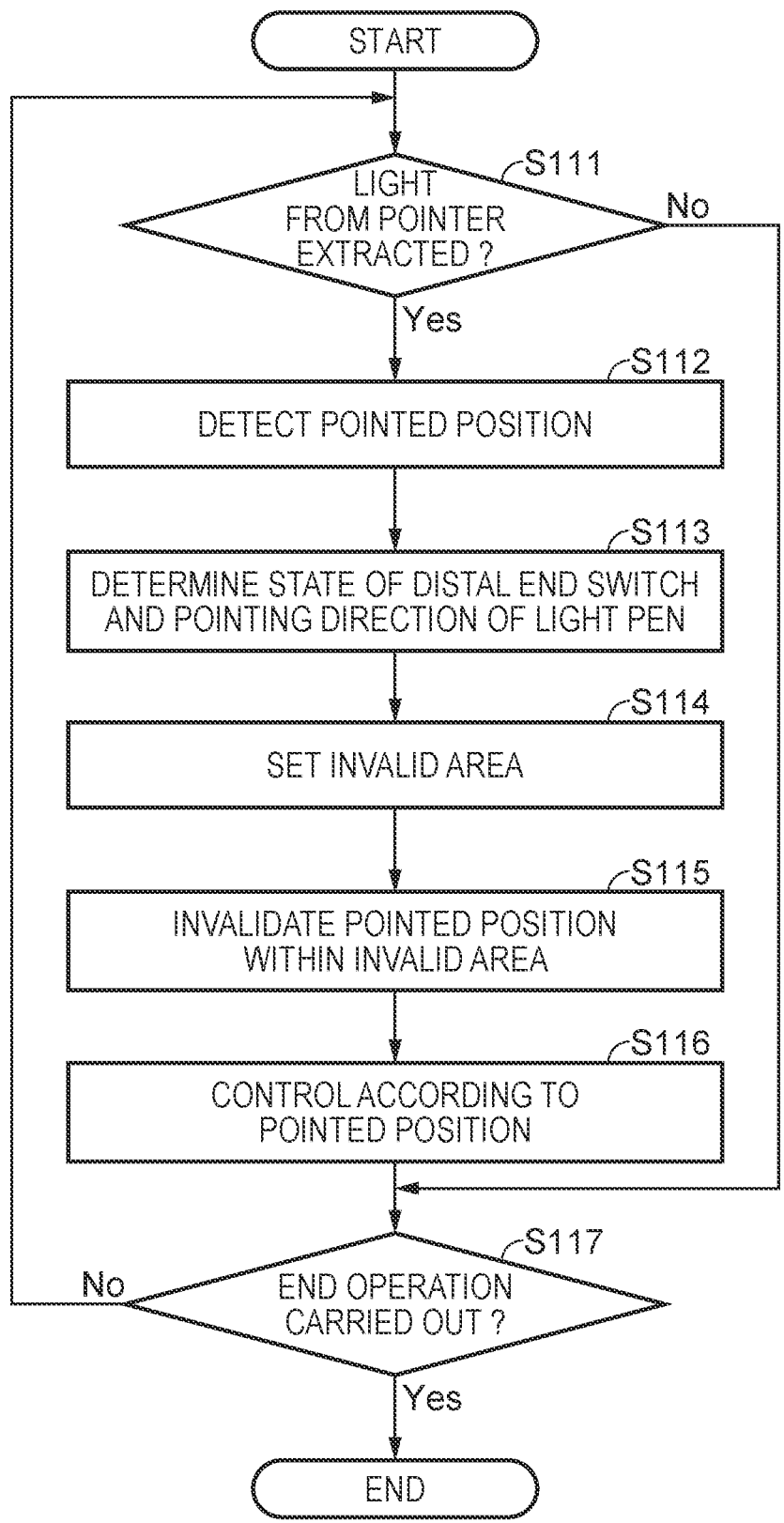
FIG. 12 is a flowchart for explaining operations of the projector according to the third embodiment.

FIG. 11 is a block diagram showing a schematic configuration of a control unit 10b of the projector 1 according to the third embodiment. FIG. 12 is a flowchart for explaining operations of the projector 1 according to the third embodiment.

As shown in FIG. 11, as in the first embodiment, the control unit 10b has, as function blocks implemented by a control program, a picked-up image analysis unit 25b, a position detection unit 26b, a state determination unit 27b, an interactive control unit 28b, and an invalid area setting unit 29b as a setting unit.

The picked-up image analysis unit 25b analyzes each of images based on picked-up image information inputted from the image pickup unit 14, that is, each of picked-up images picked up repeatedly by the image pickup unit 14, and extracts the light from the pointer, that is, the light emitted from the light pen 3, and the detection light reflected by the finger F or the like, from the detection area Ad within the picked-up image.

If the picked-up image analysis unit 25b extracts the light from the pointer (Yes in step S111), the position detection unit 26b detects the positions pointed by the light pen 3 and the finger F or the like extracted by the picked-up image analysis unit 25b (step S112). The position detection unit 26b outputs information representing the detected pointed positions to the invalid area setting unit 29b.

The state determination unit 27b determines the state of the distal end switch 33 of the light pen 3 and the pointing direction Ds of the light pen 3, based on the result of the analysis by the picked-up image analysis unit 25b (step S113). The state determination unit 27b outputs information representing the determined state of the distal end switch 33 to the interactive control unit 28b and outputs information representing the determined pointing direction Ds of the light pen 3 to the invalid area setting unit 29b.

The invalid area setting unit 29b sets the invalid area Ax within the detection area Ad, based on the position Ps pointed by the light pen 3 specified by the position detection unit 26b and the pointing direction Ds of the light pen 3 determined by the state determination unit 27b (step S114). The invalid area setting unit 29b then invalidates the pointed position within the set invalid area Ax, of the positions pointed by the second pointer such as the finger F detected by the position detection unit 26b, and outputs only the valid pointed position to the interactive control unit 28b (step S115).

The interactive control unit 28b controls operations of the projector 1, based on the pointed position outputted from the invalid area setting unit 29b and the state of the distal end switch 33 determined by the state determination unit 27b (step S116).

Then, if the user carries out an operation to end the processing (Yes in step S117), the control unit 10b carries out necessary end processing and then ends the processing. If the operation is not carried out (No in step S117), the control unit 10b repeats this flow.

As described above, the projector 1, the image projection system 100, and the method for controlling these according to this embodiment have effects similar to those of the first embodiment.

Modifications

The foregoing embodiments may be modified as follows.

In the second embodiment, the picked-up image analysis unit 25a detects the pointing direction Ds of the light pen 3, based on the luminance distribution of the light emitted from the light pen 3. However, the method for detecting the pointing direction Ds is not limited to this example. For example, in addition to the light emitting unit 35 at the tip of the light pen 3, a light emitting unit may be provided also at the end part opposite to the tip of the pen. The picked-up image analysis unit 25a may detect the pointing direction Ds, based on the positional relation of the light emitted from the two light emitting units. In this case, to make the two light emitting units distinguishable from each other, the light emitting units may emit light of different wavelengths from each other or may emit light in different light emission sequences from each other. The light emitted from the light emitting unit 35 is equivalent to first light. The light emitted from the light emitting unit to the side opposite to the tip of the pen is equivalent to second light. Also, third light which is different from the first light may be emitted from the vicinity of the tip of the pen, and the pointing direction Ds may be detected, based on the positional relation between the second light and the third light.

The light curtain unit 2 may emit planar second detection light to a position further away from the projection Sp than the first detection light, in addition to the planar detection light (first detection light) for detecting the second pointer such as the finger F. The picked-up image analysis unit 25a may detect the pointing direction Ds of the light pen 3, based on the position of the light emitted from the light emitting unit 35 of the light pen 3 (or the position where the first detection light is reflected) and the position where the second detection light is reflected. In this case, to make the first detection light and the second detection light distinguishable from each other, the first detection light and the second detection light may have different wavelengths from each other or may be emitted in different light emission sequences from each other.

Figure 13:
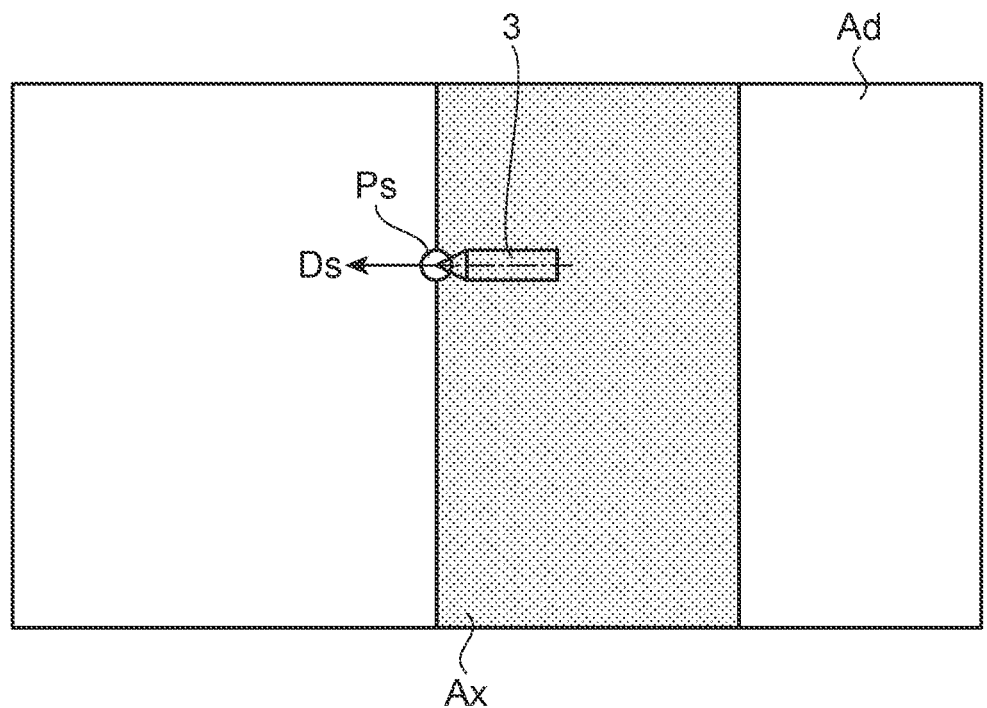
FIG. 13 shows a modification of the invalid area set within the detection area.

In the first embodiment, the invalid area setting unit 29 sets the rectangular invalid area Ax, based on the position Ps pointed by the light pen 3 and the pointing direction Ds of the light pen 3. However, the shaped of the invalid area Ax is not limited to this example. For example, the invalid area Ax may be in other shapes than rectangular, such as circular or elliptic. Also, as shown in FIG. 13, invalid area setting unit 29 may set the invalid area Ax, for example, in such a way as to penetrate the detection area in a direction perpendicular to the pointing direction Ds.

Figure 14:
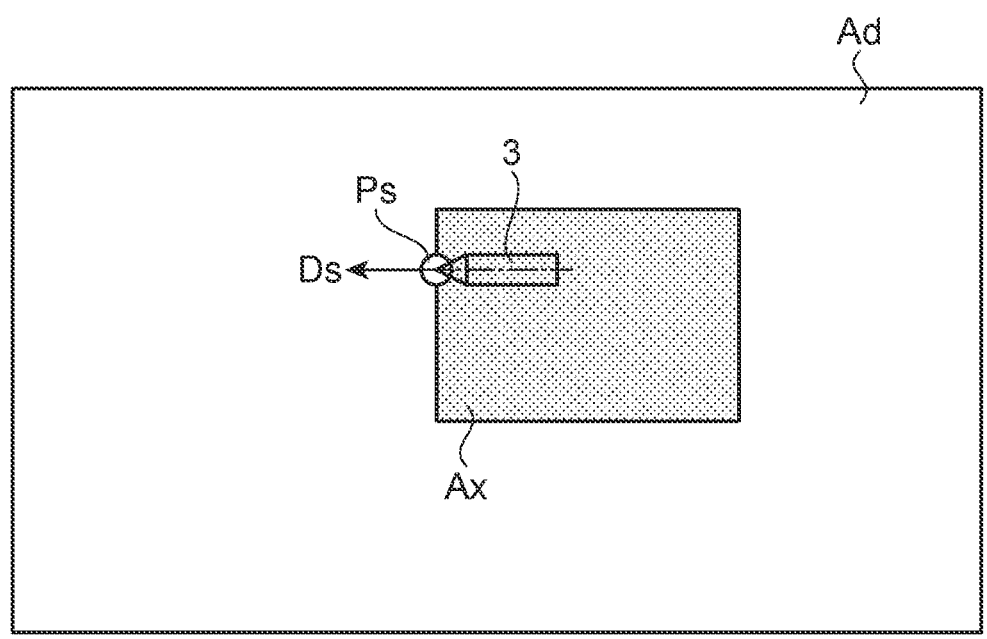
FIG. 14 shows a modification of the invalid area set within the detection area.

The invalid area setting unit 29 may also change the invalid area Ax, based on whether the projection surface Sp is vertical or horizontal. For example, if the projection surface Sp is vertical, the invalid area setting unit 29 may set the invalid area Ax in such a way that the area below the pointed position Ps is larger than the area above the pointed position Ps, as shown in FIG. 14.

In the first embodiment, the invalid area setting unit 29 sets the invalid area Ax in such away that the boundary L1 passes through the pointed position Ps. However, the invalid area setting unit 29 may set the invalid area Ax in such a way that the pointed position Ps is situated inside or outside the invalid area Ax. If the pointed position Ps is situated inside the invalid area Ax, it is desirable that the invalid area setting unit 29 sets the invalid area Ax in such a way that the area in the direction opposite to the pointing direction Ds from the pointed position Ps is larger than the area in the pointing direction Ds from the pointed position Ps, that is, the distance from the pointed position Ps to the boundary L3 is longer than the distance from the pointed position Ps to the boundary L1.

In the first embodiment, the size of the invalid area Ax may be decided, based on the number of pixels. The size of the invalid area Ax may also be decided in such a way as to have a desired size on the actual projection surface Sp. For example, a measuring unit which measures the size (projection size) of the projection area Ap on the projection surface Sp, or a unit which allows the user to input a projection size, may be provided in the projector 1. The invalid area setting unit 29 may adjust the number of pixels in the invalid area Ax according to the projection size. Thus, the size of the invalid area Ax on the projection surface Sp can be kept constant regardless of the projection size. This configuration makes it possible to have the invalid area Ax of a proper size, for example, in relation to the size of the user (person), and to restrain the invalid area Ax from becoming excessively large.

In the first embodiment, an example where the attitude detection unit 34 of the light pen 3 detects the pointing direction every 30 degrees or every 45 degrees is described. However, the attitude detection unit 34 may detect the pointing direction with a higher accuracy or with a lower accuracy (for example, every 90 degrees or every 180 degrees). If the detection accuracy is every 180 degrees, the attitude detection unit 34 may decide, for example, that the pointing direction is either to the right or to the left.

In the first embodiment, the result of the detection by the attitude detection unit 34 (pointing direction) is sent to the projector 1 via the light emission sequence from the light emitting unit 35. However, this example is not limiting. For example, both the projector 1 and the light pen 3 may have a communication unit for wireless communication based on Bluetooth (trademark registered) or the like, and the result of the detection may be sent via these communication units. In this case, the projector 1 may transmit a synchronization signal to be transmitted to the light pen 3, via the communication unit.

In the first to third embodiments, the projector 1 is described as an example of the position detection device. However, the position detection device is not limited to the projector 1 and may be another image display device (for example, liquid crystal display) or may be various other devices than the image display device. Also, the configuration in which the light curtain unit 2 emits planar detection light is not limiting, and the position pointed by the second pointer may be detected via a touch panel. The first pointer is not limited to the light pen 3 emitting light and may be a pointer which emits radio waves.

In the first embodiment, the transmission-type liquid crystal light valves 22R, 22G, 22B are used as light modulation devices. However, reflection-type light modulation devices such as reflection-type liquid crystal light valves can also be used. Also, a digital mirror device or the like which controls the direction of emission of incident light for each micromirror as a pixel and thus modulates the light emitted from the light source 21 can be used. The configuration having a plurality of light modulation devices corresponding to individual colors is not limiting. A single light modulation device which modulates a plurality of color light beams in a time-divisional manner may be employed.

The entire disclosure of Japanese Patent Application No. 2017-185854, filed Sep. 27, 2017 is expressly incorporated by reference herein.

What is claimed is:

1. A position detection device comprising:
a sensor that detects a position pointed by a first pointer and a position pointed by a second pointer within a detection area; and
a processor that functions as:
a direction determination unit which determines a pointing direction of the first pointer, the pointing direction being a direction in which a tip of the first pointer faces; and
a setting unit which sets an invalid area where the position pointed by the second pointer is invalid, within the detection area, based on the position pointed by the first pointer detected by the sensor and the pointing direction of the first pointed determined by the direction determination unit,
wherein
the sensor detects the position pointed by the first pointer, based on a position of light emitted from the first pointer, and
the direction determination unit determines the pointing direction of the first pointer, based on luminance distribution of the light emitted from the first pointer.

2. The position detection device according to claim 1, wherein
the setting unit sets the invalid area to the side opposite to the pointing direction determined by the direction determination unit, from the position pointed by the first pointer detected by the position detection unit.

3. The position detection device according to claim 1, wherein
the direction determination unit acquires detection information about the pointing direction of the first pointer from the first pointer and determines the pointing direction, based on the detection information.

4. A method for controlling a position detection device which detects a position pointed by a first pointer and a position pointed by a second pointer within a detection area, the method comprising:
detecting the position pointed by the first pointer, based on a position of first light emitted from the first pointer, within the detection area;
determining a pointing direction of the first pointer based on a position of second light emitted from the first pointer, the pointing direction being a direction in which a tip of the first pointer faces; and
setting an invalid area where the position pointed by the second pointer is invalid, within the detection area, based on the position pointed by the first pointer that is detected and the pointing direction of the first pointer that is determined.

5. A position detection device comprising:
a sensor that detects a position pointed by a first pointer and a position pointed by a second pointer within a detection area; and a processor that functions as:
a direction determination unit which determines a pointing direction of the first pointer, the pointing direction being a direction in which a tip of the first pointer faces; and
a setting unit which sets an invalid area where the position pointed by the second pointer is invalid, within the detection area, based on the position pointed by the first pointer detected by the sensor and the pointing direction of the first pointer determined by the direction determination unit,
wherein
the sensor detects the position pointed by the first pointer, based on a positioin of first light emitted from the first pointer, and
the direction determination unit determines the pointing direction of the first pointer, based on a position of second light emitted from the first pointer.

6. The position detection device according to claim 5, wherein
the setting unit sets the invalid area to the side opposite to the pointing direction determined by the direction determination unit, from the position pointed by the first pointer deteted by the sensor.

7. The position detection device according to claim 5, wherein
the direction determination unit acquires detection information about the pointing direction of the first pointer from the first pointer and determines the pointing direction, based on the detection information.

* * * * *